(No Model.)
W. W. DOOLITTLE.
PIPE JOINT.
No. 262,581. Patented Aug. 15, 1882.
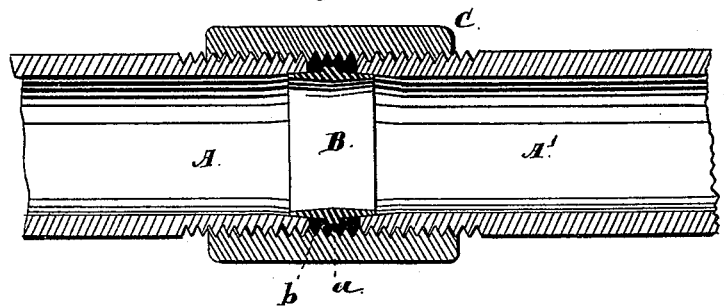
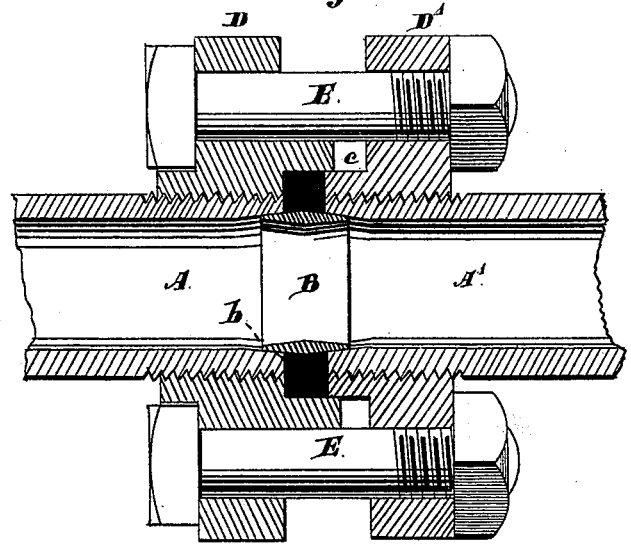
Witnesses:
Albert H. Adams.
Edgar T. Borck
Inventor:
William W. Doolittle

UNITED STATES PATENT OFFICE.

WILLIAM W. DOOLITTLE, OF CHICAGO, ILLINOIS, ASSIGNOR TO HIMSELF AND JACOB W. SKINKLE, OF SAME PLACE.

PIPE-JOINT.

SPECIFICATION forming part of Letters Patent No. 262,581, dated August 15, 1882.

Application filed April 7, 1882. (No model.)

*To all whom it may concern:*

Be it known that I, WILLIAM W. DOOLITTLE, residing at Chicago, in the county of Cook and State of Illinois, and a citizen of the United States, have invented a new and useful Improvement in Pipe-Joints, of which the following is a full description, reference being had to the accompanying drawings, in which—

Figure 1 is a longitudinal section showing my improvement applied to a pipe-joint in connection with a "coupling." Fig. 2 is a longitudinal section showing my improvement in connection with a so-called "union."

Metal pipes are extensively used for the purpose of conveying liquids and gases, which pipes are made in sections, the ends of which have been heretofore connected together by joints of various kinds. It is a difficult matter to so connect the sections of such pipes that gases under pressure will not escape at the joints.

The object of my invention is to render pipe-joints sufficiently tight to prevent the escape of gas therefrom by means of devices which can be readily applied to the joints; and this I accomplish by means of a metal ring located inside of the two ends of the pipes where the joint is formed, in connection with a packing-ring of suitable material, the two ends of the pipe being drawn and held together by a suitable coupling or union, all as hereinafter fully described.

In the drawings, A A' represent the two ends of two pipes.

B is a metal ring inserted upon the inside of the ends of these two pipes A A'. The outer surface of this ring B is to be beveled slightly at or near the center, and the inside of each pipe is correspondingly slightly beveled at each end, so that the ring B can only pass a little way into the pipes. Instead of beveling these parts, as shown, the pipes could be recessed or counterbored, forming in each a shoulder near the end to prevent the ring B from passing too far into the pipes. As represented in Fig. 1, there is a small shoulder or rib, $a$, upon the outside of and at the center of the ring B; but this is not essential.

$b$ represents a packing-ring, of soft metal or rubber or other suitable material, which encircles the central portion of the ring B, and is located between the adjacent ends of the pipes A A', the ends of which pipes are screw-threaded.

C is an ordinary screw-threaded coupling, by the means of which the ends of the two pipes are connected.

When the parts are in the position shown in Fig. 1 the packing-ring $b$ will be inclosed in a chamber, from which chamber such packing-ring cannot escape or be forced out at any point; and such packing-ring or material can be so compressed by screwing the ends of the pipes into the coupling C that such packing will perfectly fill the chamber in which it is placed, thoroughly closing and protecting all the joints, so that gas cannot escape.

In Fig. 2 I have shown the same ring, B, as is shown in Fig. 1, except that the rib $a$ on the outside is omitted. In this Fig. 2, A A' represent the adjacent ends of two pipes; B, the metal ring inside the pipes; $b$, the packing-ring, surrounding the ring B and located between the adjacent ends of the pipes A A'. As shown in this Fig. 2, the pipes are connected together by means of a union consisting, as shown, of two flanges, D D', which are screwed upon the ends of the pipes A A'. As shown, the flange D is recessed to receive the packing-ring $b$, and the flange D' has a projection, $c$, which comes in contact with one side of the packing $b$, which, when the parts are in the position shown in Fig. 2, is located in a closed chamber, from which it cannot escape in any direction. In this case the ends of the pipes and the flanges D D' are to be drawn together and held by means of any suitable number of bolts, E, the packing-ring being compressed sufficiently to perfectly fill the chamber in which it is located at all points, effectually preventing the escape of gas through the joint.

I do not limit myself to the precise devices shown in Fig. 2 for connecting and holding the pipes together.

My invention may be used with pipes which are to be used for conveying liquids, as well as those to be used for gases.

I am aware that lead and other flexible pipes have been coupled together by inserting a hollow expanding-plug within the ends of the pipes, then placing tapering sleeves around the expanded portions of the pipes, which sleeves are provided with external screw-threads, a packing being interposed between the ends of the pipes, and the tapering sleeves being drawn toward each other by a nut engaging the screw-threads of the sleeves, so that the plug expands the pipe tightly against the sleeves. Such, however, is not my invention, as I form screw-threads directly on the ends of iron pipes, arrange thereon an internally-threaded coupling device, place between the ends of the iron pipes a packing and a metallic ring within the ends of the pipes, all in such manner that the pipes can be drawn toward each other against the interposed packing, which, in connection with the metal ring, forms a gas-tight joint.

What I claim as new, and desire to secure by Letters Patent, is as follows:

The iron or similar unyielding pipes A A', having screw-threads formed in their exterior surfaces, in combination, with the metal ring B, arranged within the ends of the pipes, the interposed packing-ring, and the internally-threaded coupling device engaging the screw-threads formed in the pipes and serving to draw the ends of the latter toward each other, substantially as shown and described.

WILLIAM W. DOOLITTLE.

Witnesses:
ALBERT H. ADAMS,
EDGAR T. BOND.